United States Patent [19]
Robert et al.

[11] Patent Number: 5,722,286
[45] Date of Patent: *Mar. 3, 1998

[54] TORQUE/POSITION TRANSDUCER

[75] Inventors: Raoul W. Robert; Thomas Rogan Bernard, both of Baton Rouge; Jan Mark Bullock, St. Amant; Ronald H. Drushel, Baton Rouge, all of La.

[73] Assignee: T & R Solutions, Inc., Prairieville, La.

[*] Notice: The term of this patent shall not extend beyond the expiration date of Pat. No. 5,524,485.

[21] Appl. No.: 659,711

[22] Filed: Jun. 10, 1996

Related U.S. Application Data

[63] Continuation-in-part of Ser. No. 374,846, Jan. 19, 1995, Pat. No. 5,524,485.

[51] Int. Cl.$^6$ .................................................. G01M 19/00
[52] U.S. Cl. .................. 73/168; 73/862.191; 73/862.325
[58] Field of Search ............................... 73/168, 862.191, 73/862.635, 862.338, 862.69, 862.324, 862.325

[56] References Cited

U.S. PATENT DOCUMENTS

| | | | |
|---|---|---|---|
| 3,863,888 | 2/1975 | Hines | 251/130 |
| 4,173,265 | 11/1979 | Kremer | 73/862.325 X |
| 4,498,336 | 2/1985 | Dalton. | |
| 4,570,903 | 2/1986 | Crass. | |
| 4,759,224 | 7/1988 | Charbonneau et al.. | |
| 4,783,998 | 11/1988 | Sander | 73/862.324 X |
| 4,787,245 | 11/1988 | Anderson et al.. | |
| 4,977,782 | 12/1990 | Stohr. | |
| 4,984,474 | 1/1991 | Matsushima et al. | 73/862.325 |
| 5,029,597 | 7/1991 | Leon. | |
| 5,033,012 | 7/1991 | Wohld | 73/1 C X |
| 5,197,338 | 3/1993 | Heiman et al. | 73/168 X |
| 5,197,358 | 3/1993 | Heiman et al.. | |
| 5,199,301 | 4/1993 | Bauer. | |
| 5,239,874 | 8/1993 | Hale. | |
| 5,329,956 | 7/1994 | Marriott et al. | 73/168 X |
| 5,396,167 | 3/1995 | Leon. | |
| 5,430,368 | 7/1995 | Leon. | |
| 5,432,436 | 7/1995 | Leon et al.. | |
| 5,433,245 | 7/1995 | Prather. | |
| 5,469,737 | 11/1995 | Smith et al. | 73/168 |
| 5,492,009 | 2/1996 | Kempf et al. | 73/168 |

*Primary Examiner*—Elizabeth L. Dougherty
*Attorney, Agent, or Firm*—Michael A. O'Neil; Russell N. Rippamonti

[57] ABSTRACT

A torque/position transducer is positioned between the valve stem of a valve and a valve operator adapted to open and close the valve and includes a body section including an input lug adapted for mating the engagement with the output lug of the valve operator and an output lug adapted for mating the engagement with the valve stem of the valve. A pair of strain gauges are mounted on the body of the torque/position transducer and function to generate an output signal indicative of the amount of torque necessary to open or close the valve. The body further includes a cam secured to the body section. A magnet is positioned in movable contact with the cam. A magneto-resistive sensor senses the movement of the magnet as the cam varies the distance from said magnet to said sensor and generates a signal indicative of the position of the valve stem with respect to the valve under the action of the valve operator.

7 Claims, 7 Drawing Sheets

5,722,286

TORQUE/POSITION TRANSDUCER

RELATED APPLICATION

This application is a continuation-in-part of application Ser. No. 08/374,846, filed Jan. 19, 1995, which is now U.S. Pat. No. 5,524,485.

TECHNICAL FIELD

The present invention relates generally to torque/position transducers and, more particularly, to a unique torque/position transducer that is particularly adapted for use in conjunction with valves and operators therefore.

BACKGROUND AND SUMMARY OF THE INVENTION

At the present time, valves such as those employed in petroleum pipelines and the like are typically not manually operated. Rather, such valves are opened and closed utilizing valve operators. Valve operators for pipeline valves typically comprise an electric or fluid operated motor and a speed reducer which operate in combination to provide the output torque necessary to open and/or close the valve.

It has been determined that the torque necessary to open or close a valve is indicative of the operating condition of the valve. It is, therefore, useful to measure the torque necessary to operate the valve as a function of the operational status of the valve which in turn predicts the time remaining before the valve must be either serviced or replaced. The measurement of the torque necessary to operate the valve is a function of the positioning of the valve, with the highest torque requirement usually occurring at the start of the valve opening or closing operation.

SUMMARY OF THE INVENTION

The present invention comprises a torque/position transducer which is located between the valve operator and the valve stem of a valve and which functions to generate an output indicative of the torque necessary to open or close the valve and the positioning of the valve when the torque measurement is made.

The torque/position transducer comprises a body including an input lug which mates with the output lug of the valve operator and an output lug which mates with the valve stem of the valve to be opened or closed. A pair of strain gauges are mounted on the body of the torque/position transducer and function to generate an output signal indicative of the amount of torque necessary to open or close the valve. The body further includes a cam secured to the body section. A magnet is positioned in movable contact with the cam. A magneto-resistive sensor senses the movement of the magnet as the cam varies the distance from said magnet to said sensor and generates a signal indicative of the position of the valve stem with respect to the valve under the action of the valve operator.

BRIEF DESCRIPTION OF DRAWINGS

A more complete understanding of the present invention may be had by reference to the following Detailed Description when taken in conjunction with the accompanying Drawings, in which.

DETAILED DESCRIPTION

Figure 1:
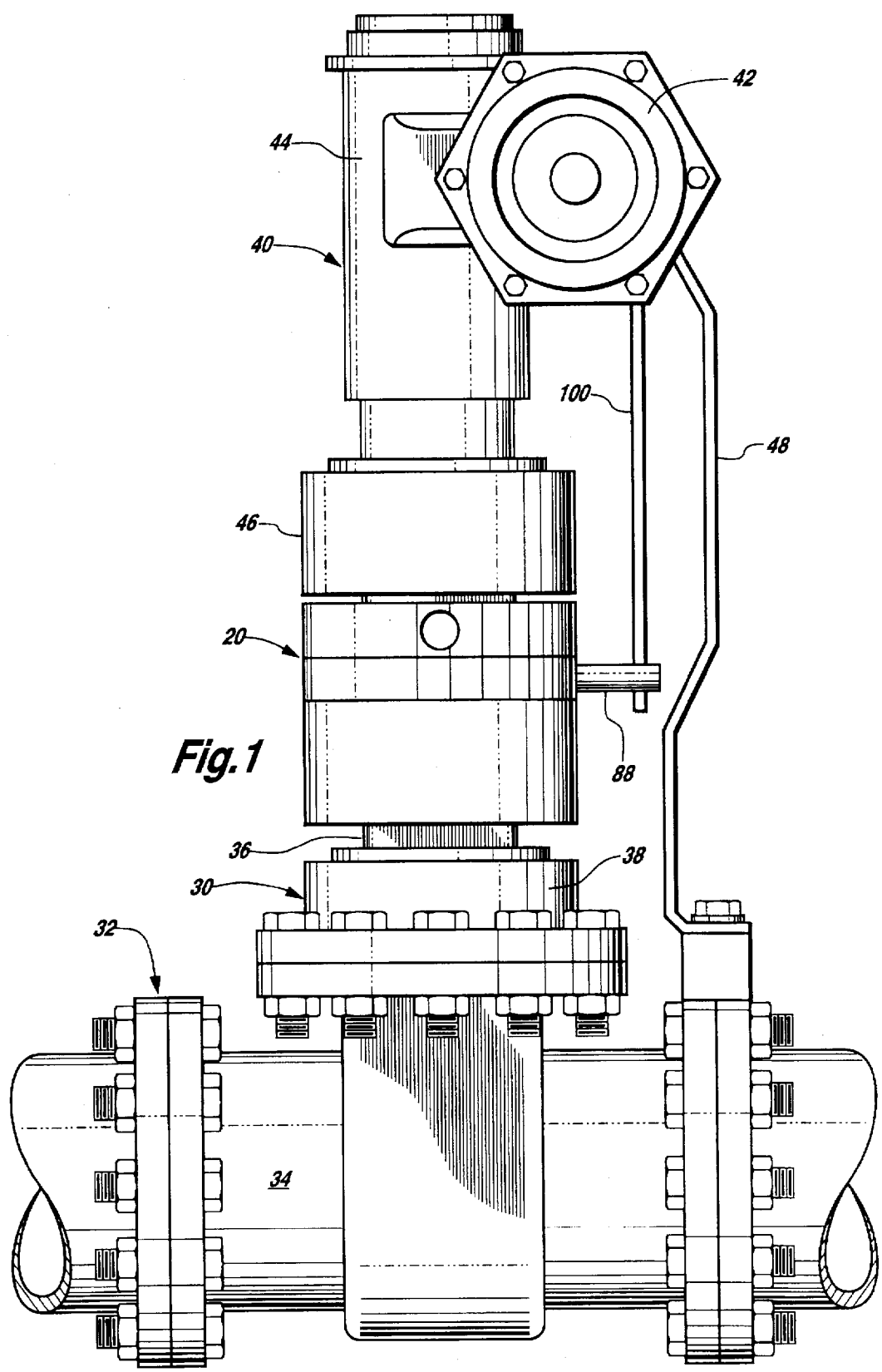
FIG. 1 is a side view of a first embodiment of a torque/position transducer incorporating the present invention shown in its operating environment.
Figure 2:
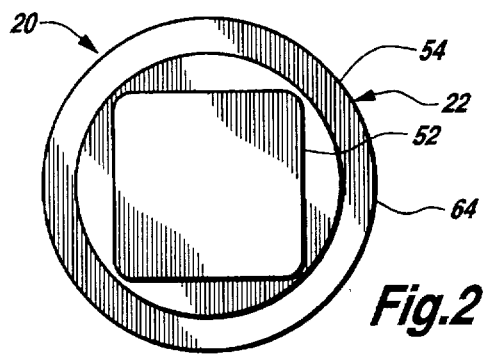
FIG. 2 is a top view of the body of the torque/position transducer of FIG. 1.
Figure 6:
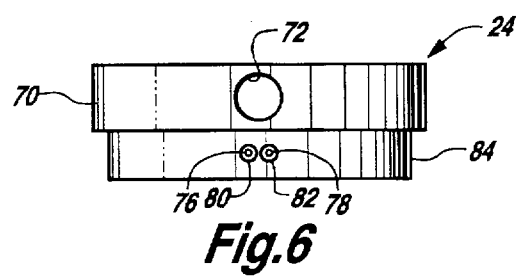
FIG. 6 is a side view of one of the interlocking rings of the torque/position transducer of FIG. 1.
Figure 3:
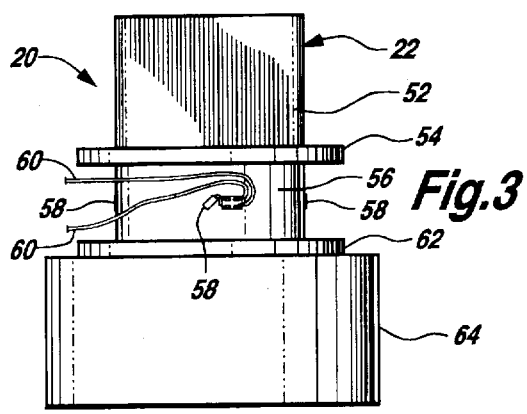
FIG. 3 is a side view of the body of FIG. 2.
Figure 7:
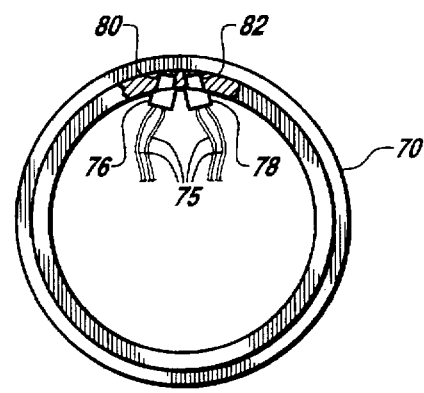
FIG. 7 is a top view of the interlocking ring of FIG. 6.
Figure 4:
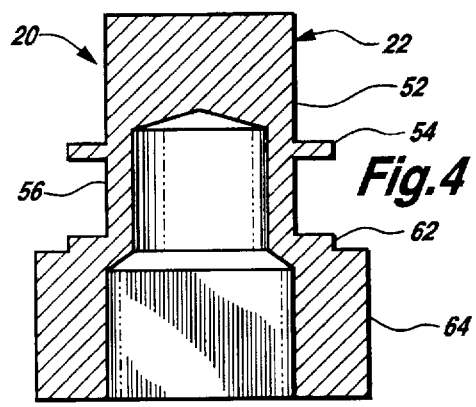
FIG. 4 is a longitudinal sectional view of the body of FIG. 2.

Referring now to the Drawings, and in particular to FIG. 1 thereof, there is shown a torque/position transducer 20 incorporating the present invention. In FIG. 1, the torque/position transducer 20 is shown operably connected between a valve 30 and a valve operator 40. The valve 30 is positioned in a pipeline 32 and comprises a valve body 34. The valve contained within the valve body 34 is actuated by a valve stem 36 extending from a packing housing 38 at the upper end of the valve body 34.

The valve operator 40 comprises a motor 42 which may be either manual, electric or fluid operated. Typically, the motor 42 will be hydraulically driven. The motor has an output which is operably connected to a speed reducer 44. The speed reducer 44 in turn drives a drive lug 46. The valve operator 40 is supported above the valve 30 on a bracket 48.

Figure 10:
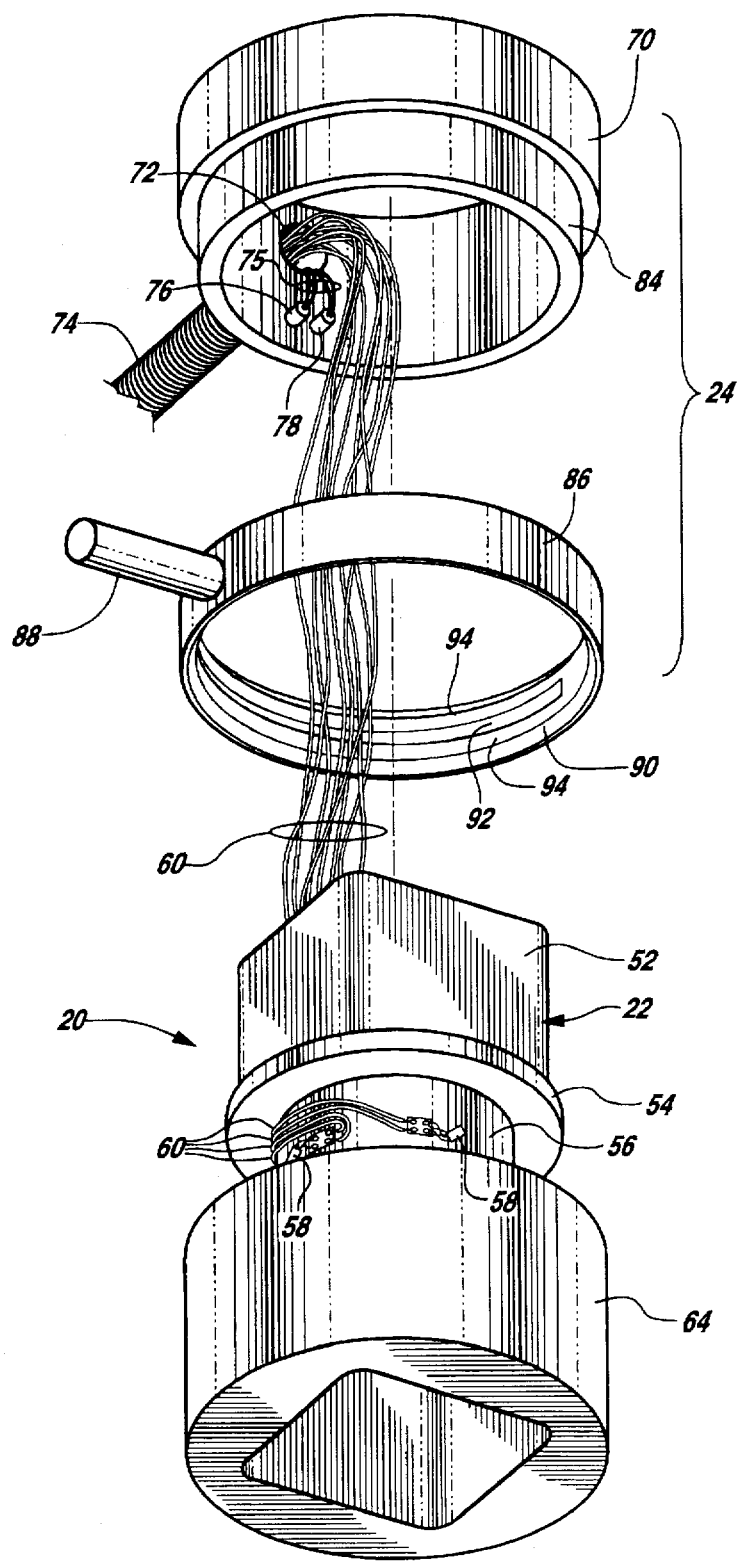
FIG. 10 is a perspective view of the torque/position transducer of the present invention in which the component parts thereof are shown in a longitudinally exploded orientation.

Referring now to FIG. 10, the torque/position transducer 20 of the present invention comprises a body 22 and a pair of interlocking rings 24 which are ordinarily telescopingly received around the body 22. As is best shown in FIGS. 2 through 5, the body 22 of the torque/position transducer 20 includes an upper input lug 52 which is square in cross-section. The lug 52 extends to a flange 54 which in turn extends to a cylindrical section 56. The cylindrical section 56 has a plurality of strain gauges 58 mounted thereon.

The torque/position transducer 20 comprises a plurality of strain gauges 58 mounted at spaced apart locations around the periphery of the cylindrical section 56 of the body 22. The strain gauges 58 are preferably angularly disposed relative to the axis of the body 22, and an orientation of 45 degrees with respect to the axis of the body 22 is preferable. Each of the strain gauges 58 has a pair of output leads 60 which are directed from the strain gauge to appropriate circuitry which is used to combine and average the output of the several strain gauges 58 comprising the torque/positioning transducer 20 to provide an output indicative of the torque applied thereto.

The cylindrical portion 56 of the body 22 extends to a second flange 62 which in turn extends to an output lug 64. In the normal usage of the torque/positioning transducer 20, the lug 52 is engaged with the drive lug 46 of the valve operator 40, and the lug 64 is engaged with the valve stem 36 of the valve 30. Thus, the body 22 functions to transfer torque from the valve operator 40 to the valve 30.

As will be apparent, to the extent the drive lug 46 of the valve operator 40 rotates in advance of the valve stem 36 of the valve 30, the body 22 of the torque/positioning transducer 20 is distorted. Any distortion of the body 20 results in deformation of the strain gauges 58 which in turn causes strain gauges 58 to generate a variance in voltage. The strain gauges 58 produce a very small change in voltage which is amplified to produce a one to five volt signal. The one to five volt signal is then converted to a four to twenty milliamp signal which is compatible with industrial standards for electronic control and measuring devices. At rest, the signal produced is twelve milliamps. This is the mid point between four and twenty milliamps. A signal greater than twelve milliamps represents torque that is measured when the valve stem is rotated in a clockwise direction and a signal less than twelve milliamps represents torque measured when the stem is rotated in a counterclockwise direction.

It will thus be understood that the strain gauges 58 attached to the cylindrical section 56 of the body 22 of the torque/position transducer 20 generate an output signal which is indicative of the angular differentiation between the valve operator 40 and the valve 30 as the valve operator 40 is actuated to either open or close the valve 30. Such measurement is in turn indicative of the operating condition of the valve. Thus, by monitoring the torque necessary to open or close the valve, the necessity of repair or replacement of the valve at a predetermined period of time can be determined.

The interlocking rings 24 of the torque/position transducer are best shown in FIGS. 6–9. A moving ring 70 is engaged with input lug 52 of the body 22 by means of a light press fit. Thus, the ring 70 is fixed to the lug 52 and is not permitted to rotate with respect thereto, but rather moves with the body 22.

Referring to FIG. 10, the ring 70 has an aperture 72 formed therein. The aperture 72 extends to an armored cable 74 which is used to carry leads 60 from the strain gauges 58 outwardly to circuitry connected thereto and adapted to process the voltage changes caused in the strain gauges 58 by the application of torque to the body 22. The aperture 72 and the armored cable 74 also direct electrical leads 75 to an infrared light generator 76 and an infrared light detector 78 mounted on the interior of the moving ring 70. The infrared light generator 76 directs infrared energy through an aperture 80 formed in the ring 70, and the infrared light receiver 78 receives reflected light received back through an aperture 82 formed therein.

The moving ring 70 has a reduced diameter portion 84 extending downwardly therefrom. A fixed ring 86 is slidably received on the reduced diameter portion 84 of the moving ring 70 and has a lug 88 projecting therefrom. The interior of the ring 86 is provided with a foil layer 90.

Figure 8:
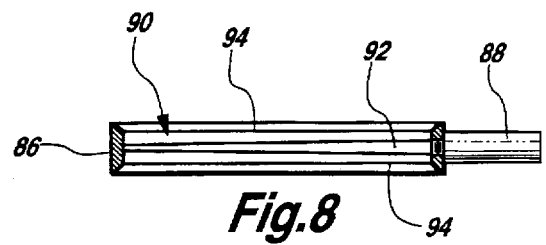
FIG. 8 is a sectional view of a second interlocking ring of the torque/position transducer of FIG. 1.
Figure 5:
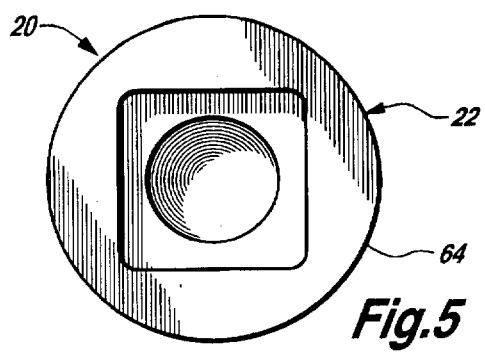
FIG. 5 is a bottom view of the body of the FIG. 2.
Figure 9:
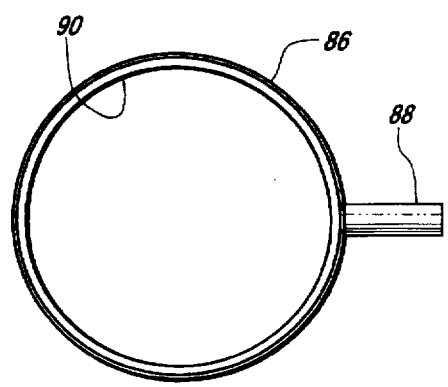
FIG. 9 is top view of the interlocking ring of FIG. 8.

As is best shown in FIG. 8, the foil layer 90 of the fixed ring 86 has a reflective portion 92. The reflective portion 92 and a non-reflective portion 94 cooperate to form a divergent reflective surface on the interior of the fixed ring 86. Thus, the amount of infrared energy directed on the foil layer 90 from the source 76 and reflected back therefrom onto the receiver 78 is dependent on the relative positioning of the fixed ring 86 relative to the moving ring 70.

Referring again to FIG. 1, a bracket 100 extends downwardly from the valve operator 40 and into engagement with the lug 88 extending from the fixed ring 86. The bracket 100 functions to prevent the fixed ring 86 from rotation relative to either the valve 30 or the valve operator 40 in either direction. Since the moving ring 70 is secured to the input lug 52 of the body 22 of the torque/position transducer 20, it is constrained to movement therewith. Therefore, as the valve 30 is opened or closed, the relative positioning of the ring 70 and the ring 86 is determined by the amount of infrared energy reflected back from the foil layer 90 of the fixed ring 86 to the receiver 78 mounted on the interior of the moving ring 70.

Figure 11:
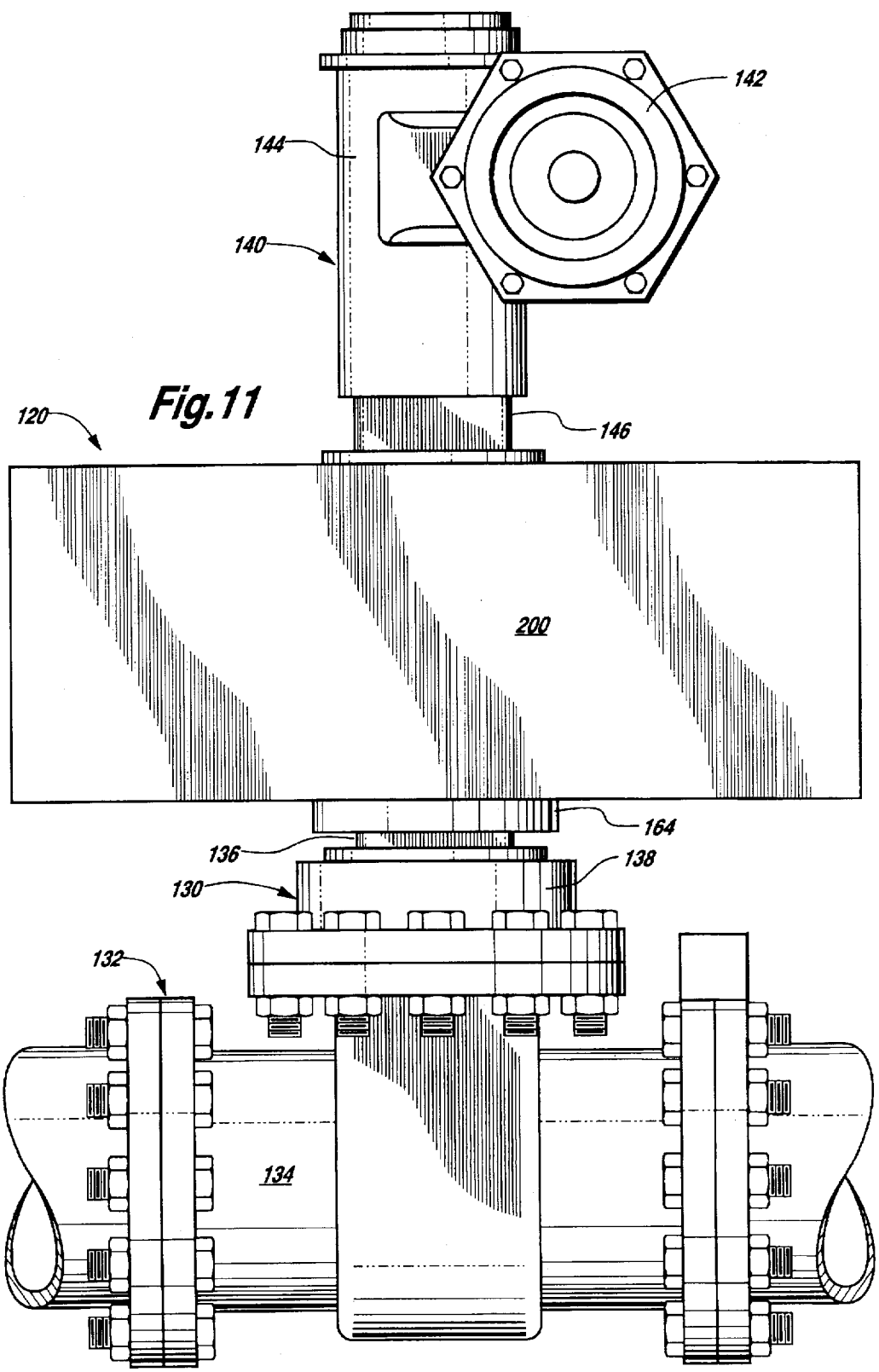
FIG. 11 is a side view of a second embodiment of a torque/position transducer incorporating the present invention shown in its operating environment.

Referring now to FIG. 11 therein is illustrated a second embodiment of the present invention. The torque/position transducer 120 is shown operably connected between a valve 130 and a valve operator 140. The valve 130 is positioned in a pipeline 132 and comprises a valve body 134. The valve contained within the valve body 134 is actuated by a valve stem 136 extending from a packing housing 138 at the upper end of the valve body 134.

The valve operator 140 comprises a motor 142 which may be either manual, electric or fluid operated. Typically, the motor 142 will be hydraulically driven. The motor 142 has an output which is operably connected to a speed reducer 144. The speed reducer 144 in turn drives a drive lug 146.

Referring now to FIGS. 12–17, the torque/position transducer 120 of the present invention comprises a body 122 including an upper input lug 152 which is square in cross-section. The lug 152 extends to a flange 154 that in turn extends to an integral cam 155. Adjacent to the cam 155 is a cylindrical section 156. The cylindrical portion 156 of the body 122 extends to an output lug 164. Output lug 164 includes a square opening 165 for receiving valve stem 136.

Figure 18:
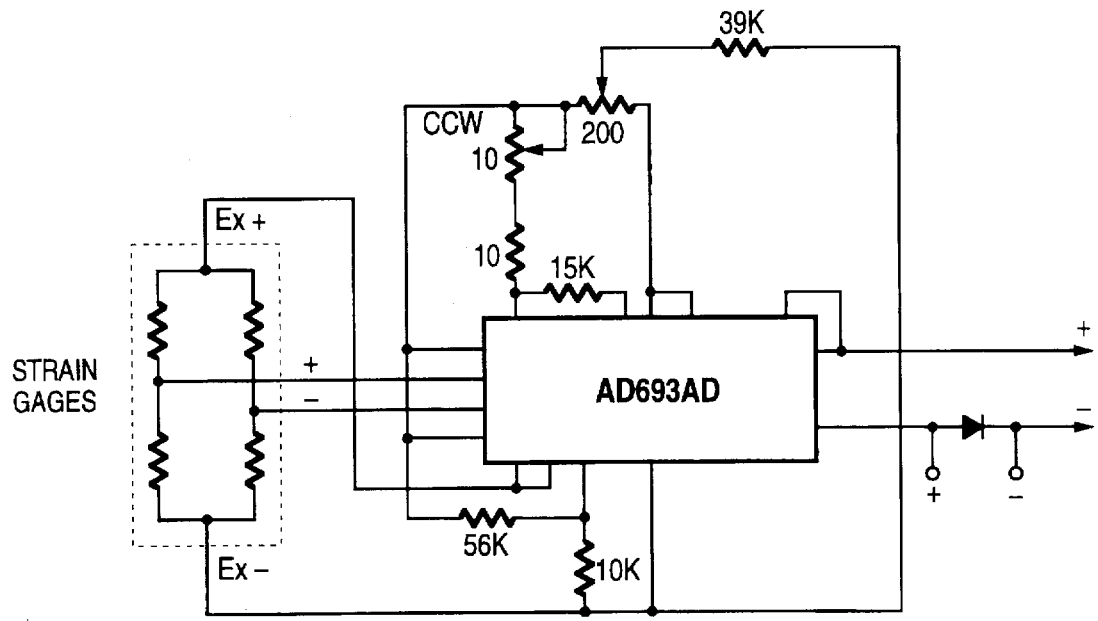
FIG. 18 is a schematic of the torque transmitter circuit of the present invention.

Cylindrical portion 156 includes a pair of 350 ohm strain gauges 158 mounted thereon. The strain gauges 158 are connected in a bridge configuration spaced 180 degrees apart on the cylindrical section 156. Each of the strain gauges 158 has a pair of output leads 160 that are connected to circuit board 180. Referring now to FIG. 18, a torque transmitter circuit diagram is disclosed wherein the output signal is converted to a 4 to 20 milliamp signal indicative of the torque applied.

In the normal usage of the torque/positioning transducer 120, the lug 152 is engaged with the drive lug 146 of the valve operator 140, and the lug 164 is engaged with the valve stem 136 of the valve 130. Thus, the body 122 functions to transfer torque from the valve operator 140 to the valve 130.

As will be apparent, to the extent the drive lug 146 of the valve operator 140 rotates in advance of the valve stem 136 of the valve 130, the body 122 of the torque/positioning transducer 120 is distorted. Any distortion of the body 120 results in deformation of the strain gauges 158 which in turn causes strain gauges 158 to generate a variance in voltage. The strain gauges 158 produce a very small change in voltage which is amplified to produce a one to five volt signal. The one to five volt signal is then converted to a four to twenty milliamp signal which is compatible with industrial standards for electronic control and measuring devices. At rest, the signal produced is twelve milliamps. This is the mid-point between four and twenty milliamps. A signal greater than twelve milliamps represents torque that is measured when the valve stem is rotated in a clockwise direction and a signal less than twelve milliamps represents torque measured when the stem is rotated in a counterclockwise direction.

It will thus be understood that the strain gauges 158 attached to the cylindrical section 156 of the body 122 of the torque/position transducer 120 generate an output signal which is indicative of the angular differentiation between the valve operator 140 and the valve 130 as the valve operator 140 is actuated to either open or close the valve 130. Such measurement is in turn indicative of the operating condition of the valve 130. Thus, by monitoring the torque necessary to open or close the valve, the necessity of repair or replacement of the valve at a predetermined period of time can be determined.

Figure 12:
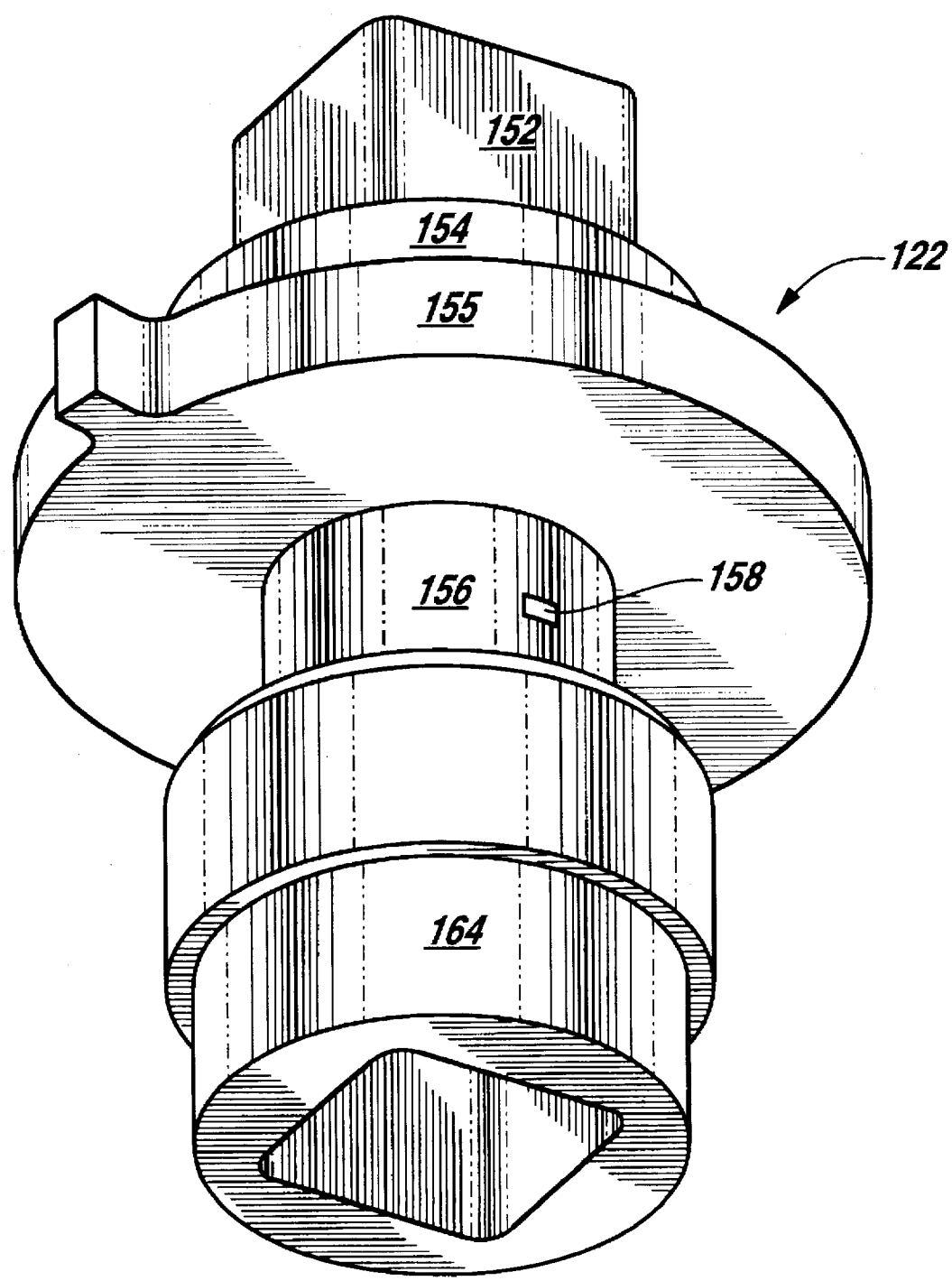
FIG. 12 is a perspective view of the body section of the torque/position transducer of FIG. 11.
Figure 13:
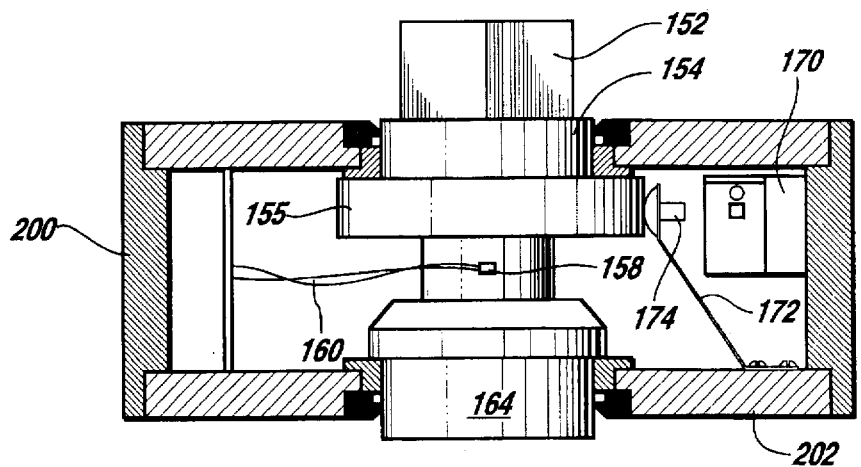
FIG. 13 is a section view of the second embodiment of a torque/position transducer of the present invention.
Figure 16:
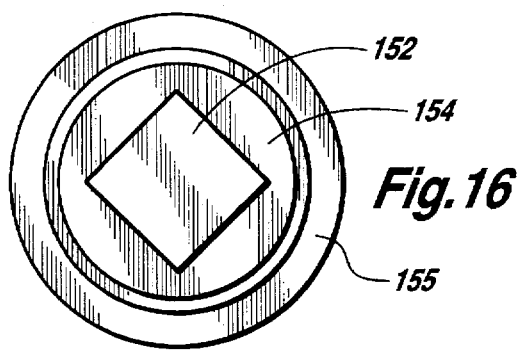
FIG. 16 is a top view of the body section of the torque/position transducer of FIG. 15.
Figure 14:
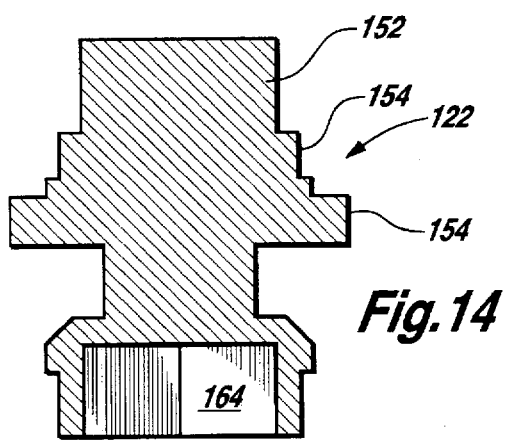
FIG. 14 is a section view of the body section of the torque/position transducer of FIG. 13.
Figure 17:
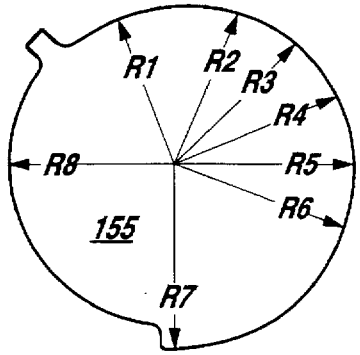
FIG. 17 is a top view of the cam located on the body section of the torque/position transducer of FIG. 15.
Figure 15:
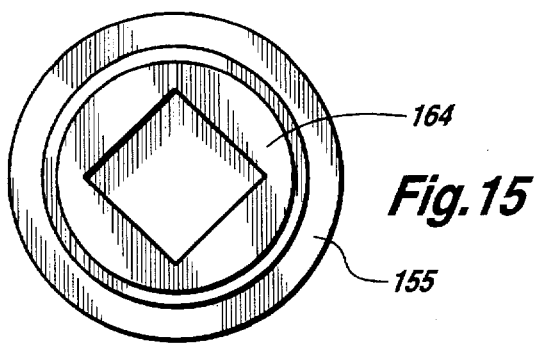
FIG. 15 is a bottom view of the body section of the torque/position transducer of FIG. 14.
Figure 19:
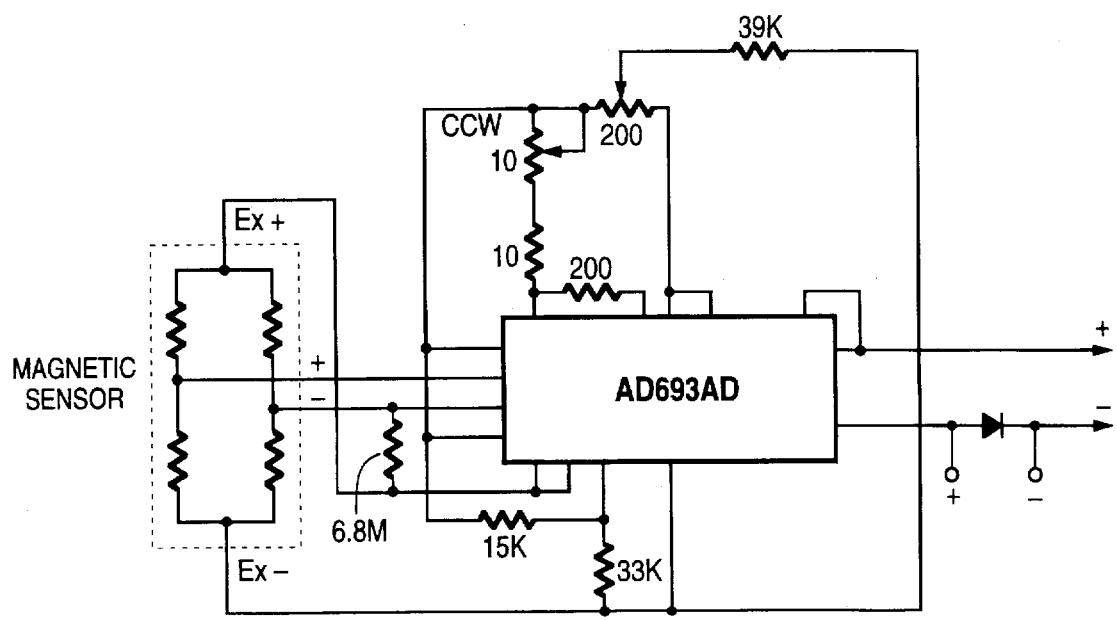
FIG. 19 is a schematic of the position transmitter circuit of the present invention.

Referring to FIGS. 12, 13 and 17 therein is illustrated cam 155 and valve position sensor 170. As illustrated in FIG. 17 cam 155 has varying radial dimensions expressed in inches, R1=1.63839; R2=1.64547; R3=1.75942; R4=1.86792; R5=1.90643; R6=1.90650; R7=1.96651; R8=1.688. The proximal end of the leaf spring 172 is affixed to a base 202 of housing 200. The distal end of leaf spring 172 includes a magnet 174 that is kept in position against cam 155. As valve 130 is operated cam 155 varies the distance for the magnet 174 to sensor 170. Turning now to FIG. 19, Valve position sensor 170 includes a NVE NVSSB100 magneto-resistive sensor, that outputs a very small change in voltage which is amplified to produce a one to five volt signal. The one to five volt signal is then converted to a four to twenty milliamp signal which is compatible with industrial standards for electronic control and measuring devices.

When assembled, body section 122 is partially enclosed in housing 200. Lug 152 extends from the top 204 of housing 200. Flange 154 is received in a circular opening in the top 204 of housing 200. Bushing 190 and seals 192 are positioned around body section 122 and received in the circular opening in the top 204 of housing 200. Output lug 164 extends through a circular opening in the bottom 202 of housing 200. Bushing 194 and seal 196 are positioned around body section 122 and received in the circular opening in the bottom 202 of housing 200.

OPERATION

In the operation of the first embodiment of the present invention, the torque/position transducer 20, the valve operator 40 is actuated to either open or close the valve 30. Depending on the condition of the valve 30, significant lag may occur between the drive lug 46 and the valve stem 36, resulting in significant deformation of the body 22 of the torque/position transducer 20. Any deformation to the body 22 causes deflection of the strain gauges 58 which in turn generates an electrical output that is transferred to external circuities through the aperture 72 and the armored cable 74 attached to the fixed ring 70.

As the valve operator 40 rotates the valve stem 36 to open or close the valve 30, the moving ring 70 moves with the valve body 20, while the fixed ring 86 is locked in place by the inter-engagement of the lug 88 with the bracket 100. Infrared energy generated by the generator 76 on the moving ring 70 is reflected onto the foil layer 90 and is reflected back therefrom to the receiver 78. The amount of energy reflected back to the receiver 78 is dependent on the amount of the reflective portion 92 of the foil layer 90 which is exposed from the energy from the generator 76. Thus, the receiver 78 provides an output indicative of the positioning of the valve 30 at the time that any particular torque output is recorded.

In the operation of the second embodiment of the present invention, the torque/position transducer 120, the valve operator 140 is actuated to either open or close the valve 130. Depending on the condition of the valve 130, significant lag may occur between the drive lug 146 and the valve stem 136, resulting in significant deformation of the body 122 of the torque/position transducer 120. Any deformation to the body 122 causes deflection of the strain gauges 158 which in turn generates an electrical output.

As the valve operator 140 rotates the valve stem 136 to open or close the valve 130, cam 155 moves magnet 174 closer or farther from position sensor 170 which in turn generates an electrical output indicating the position of valve 130 at the time that any particular torque output is recorded.

Although preferred embodiments of the invention have been illustrated in the accompanying Drawings and described in the foregoing Detailed Description, it will be understood that the invention is not limited to the embodiments disclosed, but is capable of numerous rearrangements and modifications without departing from the spirit of the invention.

We claim:

1. An apparatus for determining the torque applied by a valve actuator to a valve stem, said valve having a valve stem with a valve stem input lug, said valve actuator having a valve actuator output lug, said apparatus for determining the applied torque comprising:
   a. a rotatable body having:
      an upper input lug mated to the valve actuator output lug,
      a lower output lug mated to the valve stem input lug, and
      a cylindrical central body portion connecting the upper input lug and the lower output lug;
   b. at least two strain gauges mounted on said cylindrical central body portion; and
   c. means responsive to the output signal from said strain gauge for generating a signal indicative of the torque applied to the valve by the valve operator.

2. The apparatus for determining the torque applied by a valve actuator to a valve stem of claim 1 wherein the at least two strain gauges are mounted on the cylindrical body portion 180 degrees apart and are bridge connected.

3. The apparatus for determining the torque applied by a valve actuator to a valve stem of claim 1 further including a circuit board that converts the output of the strain gauges to a four to twenty milliamp output signal indicative of the torque applied by the valve actuator to the valve stem.

4. An apparatus for determining the position of a valve stem with respect to a valve being operated responsive to a valve actuator, said valve having a fixed valve body, a rotatable valve stem attached to a valve stem input lug, said valve actuator having a valve actuator output lug, said apparatus for determining the position of a valve stem comprising:
   a. a rotatable body including:
      an upper input lug mated to the valve actuator output lug,
      a lower output lug mated to the valve stem input lug, and a cylindrical body portion connecting the upper input lug and the lower output lug;
b. a cam secured to said cylindrical body portion for rotation therewith, said cam including:
   an exterior side disposed away from the cylindrical body;
c. a magnet positioned in movable contact with the exterior side of said cam; and
d. means responsive to the position of said magnet for generating a signal indicative of the position of the valve stem with respect to the valve.

5. The apparatus for determining the position of a valve stem with respect to a valve of claim 4 wherein the means responsive to the position of said magnet for generating a signal indicative of the position of the valve stem with respect to the valve is a magneto-resistive sensor that senses the movement of the magnet as the cam varies the distance from said magnet to said sensor.

6. The apparatus for determining the position of a valve stem with respect to a valve of claim 5 further including a circuit board that converts the output of the magneto-resistive sensor to a four to twenty milliamp output signal indicative of the position of the valve stem with respect to the valve.

7. An apparatus for determining the torque applied by a valve actuator to a valve stem at a particular position of the valve stem with respect to the valve, said valve having a fixed valve body, a rotatable valve stem attached to a valve stem input lug,
said valve actuator having a valve actuator output lug,
said apparatus for determining the position comprising:
a. a rotatable body having:
   an upper input lug mated to the valve actuator output lug,
   a lower output lug mated to the valve stem input lug, and
   a cylindrical central body portion connecting the upper input lug and the lower output lug;
b. at least two strain gauges mounted on said cylindrical central body portion;
c. means responsive to the output signal from said strain gauge for generating a signal indicative of the torque applied to the valve by the valve operator;
d. a cam secured to said cylindrical body portion for rotation therewith, said cam including:
   an exterior side disposed away from the cylindrical body;
e. a magnet positioned in movable contact with the exterior side of said cam; and
f. means responsive to the position of said magnet for generating a signal indicative of the position of the valve stem with respect to the valve.

\* \* \* \* \*